Dec. 14, 1926.
G. A. BILGERE
STEERING WHEEL LOCK
Filed April 16, 1923
1,610,735
Fig. 1.
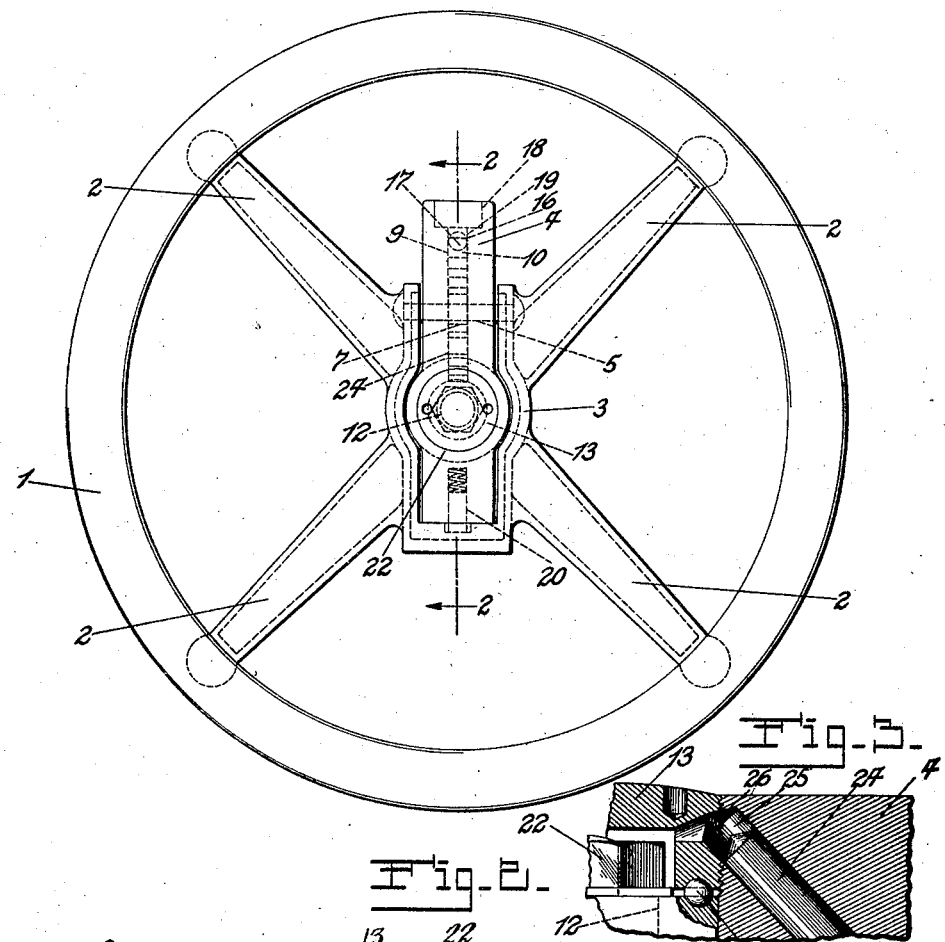
Fig. 3.
Fig. 2.
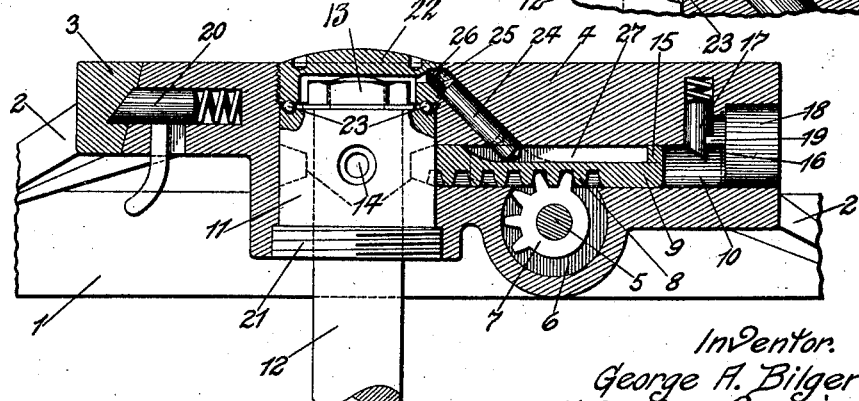
Inventor:
George A. Bilgere,
by John N. Bruninga
His Attorney.

Patented Dec. 14, 1926.

1,610,735

UNITED STATES PATENT OFFICE.

GEORGE A. BILGERE, OF ST. LOUIS, MISSOURI.

STEERING-WHEEL LOCK.

Application filed April 16, 1923. Serial No. 632,446.

This invention relates to steering wheels for automobiles and more particularly to means for securing such a wheel against unauthorized manipulation.

One of the objects of this invention is to provide a steering wheel mounting arranged so that the wheel may be moved to non-steering position and locked in said position and to provide a guard for the means for securing such wheel in place and to protect such guard from unauthorized manipulation.

Further objects will appear from the detail description taken in connection with the accompanying drawing, in which:

Figure 1 is a plan view of a steering wheel embodying this invention;

Figure 2 is a section on line 2—2, Figure 1; and

Figure 3 is an enlarged detail of Figure 2.

Referring to the drawing 1 designates the rim of a steering wheel having spokes 2 and a hub 3. The hub 3 has a forked shape adapted to fit over a block 4 and is hinged thereto by means of a pin or shaft 5. The shaft 5 is fixed to the hub 3 and has bearings in the block 4. The block 4 is provided with a recess 6 in which a gear sector 7 is adapted to move. The gear sector 7 is adapted to mesh with a rack 8 on the lower part of a locking bolt 9 working in a chamber 10 in the block 4.

A sleeve 11 is suitably keyed to the steering shaft 12 and secured in place thereon by means of a nut 13. The sleeve 11 is provided with a series of perforations 14 into which the bolt 9 may be moved by rotation of the sector 7. When the bolt 9 is engaged in one of the perforations 14, the block 4 and, therefore, the steering wheel itself are locked to the shaft 12 so that the wheel may be used for steering. Upon rotation of the hub 3 on the shaft 5, the shaft, of course, rotating with the hub, the bolt 9 will be drawn to the right, Figure 2, so as to withdraw the same from the perforation 14. With the bolt in this position the block 4 may turn freely on the sleeve 11 and there will, therefore, be no control of the shaft 12 possible by means of the wheel 1. When the bolt 9 is drawn back to its full extent the shoulder 15 thereon engages in rear of the tip 16 of the latch 17 mounted in the block 4. This serves to hold the bolt in disengaged position and also through the agency of the rack 8 and the sector 7 to lock the steering wheel in inoperative position. A key lock 18 which may be in the form of an ordinary Yale cylinder lock, or any other suitable form, may be provided with a pin 19 engaging the latch 17 to withdraw the same when the key lock is turned. By means of the key lock the bolt may, therefore, be released from the latch 17 so as to permit the steering wheel to be returned to steering position. Upon such return another spring latch 20 mounted in the block 4 is adapted to engage a corresponding notch in the forward side of the hub 3 so as to latch the wheel in steering position.

In assembling this device a screw collar 21 is first screwed into the block 4. This collar slips over the shaft 12 and the collar 21 and the block 4 rest upon the upper end of the steering column, not shown in the drawing. After slipping the collar 21 onto the shaft, the sleeve 11 is inserted in the block 4 and over the shaft 12 to which it is then suitably keyed and secured in place by means of the nut 13. When this has been done a cap or guard 22 is screwed into the block 4 and over the sleeve 11 and the nut 13, a row of balls 23 being interposed between the sleeve 11 and the cap 22, each of which is provided with a suitable race. These balls provide an anti-friction bearing on which the steering wheel may turn when in non-steering position.

The guard 22 is provided with one or more conical recesses 26 in the side thereof adapted to be engaged by the conical end of a dog 24 adapted to slide in a slot 25 in the block 4. The bolt 9 is provided along its upper edge with a slot 27 in which the end of the dog 24 may rest when the bolt is in its left hand position, Figure 2. With the bolt in this position and the dog 24 resting in the slot 27, said dog is withdrawn to a sufficient extent to disengage the same from the recess 26 and the guard 22 is, therefore, free to be unscrewed for access to the nut 13. The conical shape of the recess 26 and the corresponding shape of the end of the dog 24 cooperate to force the dog out of the recess when the guard 22 is turned in unscrewing. As the bolt 9 moves to the right, Figure 2, the cam-shaped end of the slot 27 engages the lower end of the dog 24 and forces the same upwardly so that its upper end will engage in the notch 26, thereby securing the guard 22 against unauthorized manipulation.

It will be seen, therefore, that in this device the locking mechanism is completely guarded against unauthorized interference. All of the working parts are enclosed within the block 4 except those that are guarded by the guard 22 and this guard is locked against movement when the wheel is in non-steering position. Upon return of the wheel to steering position by operation of the lock 18, the dog 24 will release the guard 22 so that access to the interior parts may be had.

It is obvious that various changes may be made in details of construction without departing from the spirit of this invention; it is, therefore, to be understood that this invention is not to be limited to the specific details shown and described.

Having thus described the invention, what is claimed is:

1. A steering gear, comprising, an operated element, a wheel mounted for movement to steering and non-steering positions, means for securing said wheel in assembled relation with said element, and means operating positively upon movement of said wheel to non-steering position adapted to guard said securing means against manipulation.

2. A steering gear, comprising, an operated element, a wheel mounted for movement to steering and non-steering positions, means for securing said wheel in assembled relation with said element, means operating positively upon movement of said wheel to non-steering position adapted to guard said securing means against manipulation, and means operating upon movement of said wheel to steering position adapted to permit manipulation of said securing means.

3. A steering gear, comprising, an operated element, a wheel mounted for movement to steering and non-steering positions, means for securing said wheel in assembled relation with said element, a removable cap for permitting access to said securing means, and means operating positively upon movement of said wheel to non-steering position adapted to fix said cap.

4. A steering gear, comprising, an operated element, a wheel mounted for movement to steering and non-steering positions, means for securing said wheel in assembled relation with said element, a removable cap for permitting access to said securing means, and means operating positively upon movement of said wheel to non-steering position adapted to fix said cap, and operating upon movement of said wheel to steering position adapted to release said cap.

5. A steering gear, comprising, an operated element, a wheel mounted for movement to steering and non-steering positions, means for securing said wheel in assembled relation with said element, a removable cap for permitting access to said securing means, an internal latch for said cap, and means operating positively upon movement of said wheel to non-steering position adapted to engage said latch with said cap.

6. A steering gear, comprising, an operated element, a wheel mounted for movement to steering and non-steering positions, means for securing said wheel in assembled relation with said element, a removable cap for permitting access to said securing means, an internal latch for said cap, and a bolt operating positively upon movement of said wheel to inoperative position adapted to engage said latch with said cap.

In testimony whereof I affix my signature this 8th day of March, 1923.

GEORGE A. BILGERE.